(12) United States Patent
Chang et al.

(10) Patent No.: US 6,399,253 B1
(45) Date of Patent: Jun. 4, 2002

(54) SECONDARY BATTERY WITH PLANAR ELECTRODES HAVING COLLECTORS WITH POLYGONAL THROUGH HOLES

(75) Inventors: Youn-han Chang, Kyungki-do; Jung-ho Kim, Cheonan, both of (KR)

(73) Assignee: Samsung SDI Co., Ltd., Suwon ( * ) Notice: Subject to any disclaimer, the term of this patent is extended or adjusted under 35 U.S.C. 154(b) by 0 days.

(21) Appl. No.: 09/546,186

(22) Filed: Apr. 10, 2000

(30) Foreign Application Priority Data

Apr. 16, 1999 (KR) .............................. 99-13488

(51) Int. Cl.[7] ................................ H01M 4/72
(52) U.S. Cl. ..................... 429/233; 429/241; 429/242; 429/245; 429/231.95
(58) Field of Search ................. 429/233, 241, 429/242, 245, 231.95

(56) References Cited

U.S. PATENT DOCUMENTS 3,944,431 A    3/1976    Ikari et al.
5,162,178 A    11/1992   Ohsawa et al.
5,360,680 A    11/1994   Goldman et al.
5,434,017 A    7/1995    Berkowitz et al.
6,245,464 B1 * 6/2001    Spillman et al. ............ 429/332

FOREIGN PATENT DOCUMENTS

JP    11067222 A  *  3/1999  .............. H01M/4/64

* cited by examiner

*Primary Examiner*—Patrick Ryan
*Assistant Examiner*—Angela J. Martin
(74) *Attorney, Agent, or Firm*—Leydig, Voit & Mayer, Ltd.

(57) ABSTRACT

A collector, an electrode and a secondary battery adopting the same. The secondary battery includes: an electrode assembly having electrodes obtained by attaching an active material sheet to at least one side of a flat collector with a plurality of through holes formed in a predetermined pattern, and a separator interposed between the electrodes; a case for sealing the electrode assembly; and tabs connected to terminals of the electrode assembly and extended outwards the case, wherein the through holes have a regular polygonal shape and the rib widths among the through holes are equal.

4 Claims, 5 Drawing Sheets

SECONDARY BATTERY WITH PLANAR ELECTRODES HAVING COLLECTORS WITH POLYGONAL THROUGH HOLES

BACKGROUND OF THE INVENTION

1. Field of the Invention

The present invention relates to a secondary battery, and more particularly, to enhanced collector and electrode structures and a secondary battery adopting the same.

2. Description of the Related Art

There are various types of rechargeable secondary batteries including a nickel-cadmium (Ni—Cd) battery, a lead acid battery, a nickel metal hydride (Ni-MH) battery, a lithium (Li) ion battery, a Li polymer batter, a metal Li secondary battery and the like.

In particular, rechargeable secondary batteries including Li have high energy density to weight ratio compared to the Ni—Cd battery or the Ni-MH battery, so their use is gradually expanding. The Li secondary battery is classified into a Li ion battery using a liquid electrolyte and a Li polymer battery using a polymer solid electrolyte, according to the type of electrolyte.

FIG. 1 shows an example of the Li polymer battery. Referring to FIG. 1, the Li polymer battery comprises an electrode assembly 11 in which a positive plate and a negative plate are stacked with a separator interposed therebetween, and a case 12 sealing the electrode assembly 11. Also, electrode tabs 13 are connected to connection tabs 13a of the positive and negative plates, the electrode tabs 13 protruding outside the case 12.

The positive and negative plates are manufactured by laminating a collector formed of copper (Cu) or aluminum (Al) with sheets respectively made of negative and positive active materials. The separator is interposed between the positive and negative plates, a plasticizer is extracted from the electrode assembly including the positive and negative plates and the separator, and then an electrolyte is injected into the empty space from which the plasticizer has been extracted.

The collector is formed of expanded metal in order to increase the adhesion with the active material sheets and to increase conductivity by increasing the contact area.

However, in manufacturing the electrode through a continuous process, the tensile force to the expanded metal acts in the same direction as that of elongation for manufacturing the expanded metal, so the collector deforms by such elongation. Thus, the expanded metal is not suitable for electrodes produced through continuous mass production systems. Also, the expanded metal is as thick as about 30 $\mu$m and the deviation in thickness thereof reaches 10 $\mu$m, so it is difficult to control the thickness when attaching the active material sheet. Also, when an electrode plate manufactured by attaching the active material sheet to a collector is cut to a predetermined size, there is burring at the cut part, thereby electrical shorting the positive and negative plates.

In order to solve these problems, a punched metal has been used for collectors. However, openings formed in the punched metal are very critical to the properties of the electrode assembly. That is, if the openings of the punched metal are too small, electrical conductivity is improved while smooth extraction of a plasticizer is not guaranteed. Otherwise, the electrical conductivity is reduced even though the plasticizer can be easily extracted.

SUMMARY OF THE INVENTION

To solve the above problems, it is an object of the present invention to provide a collector, an electrode and a secondary battery adopting the same, in which deformation of the collector, caused by a tensile force during a continuous manufacturing process, can be minimized, electrical conductivity of the collector is good and a plasticizer can be smoothly extracted from the collector.

According to an aspect of the object, the present invention provides a collector of a battery, comprising a thin plate member in which a plurality of through holes are formed in a predetermined pattern with a uniform rib width.

Preferably, the through holes have a circular or regular polygonal shape.

According to another aspect of the object, the present invention provides an electrode of a battery, comprising: a collector formed as a flat member in which a plurality of through holes are formed in a predetermined pattern; and an active sheet attached to at least one side of the collector, wherein assuming that the thickness of the collector is T1 and the sum of the thicknesses of the collector and the active material sheet is T2, $T2 \leq 6.32 \times T1$.

Assuming that the size of the through holes is M and the sum of the thicknesses of the collector and the active material sheet is T2, preferably, $3.75T2 \leq M \leq 18.75T2$.

Assuming that the pitch between the through holes is P and the sum of the thicknesses of the collector and the active material sheet is T2, preferably, $1.2M \leq P \leq 1.6M$.

According to still another aspect of the object, the present invention provides a secondary battery comprising: an electrode assembly having electrodes obtained by attaching an active material sheet to at least one side of a flat collector with a plurality of through holes formed in a predetermined pattern, and a separator interposed between the electrodes; a case for sealing the electrode assembly; and tabs connected to terminals of the electrode assembly and extended outwards the case, wherein the through holes have a regular polygonal shape and the rib widths among the through holes are equal.

BRIEF DESCRIPTION OF THE DRAWINGS

The above object and advantages of the present invention will become more apparent by describing in detail preferred embodiments thereof with reference to the attached drawings in which.

DESCRIPTION OF THE PREFERRED EMBODIMENTS

Figure 1:
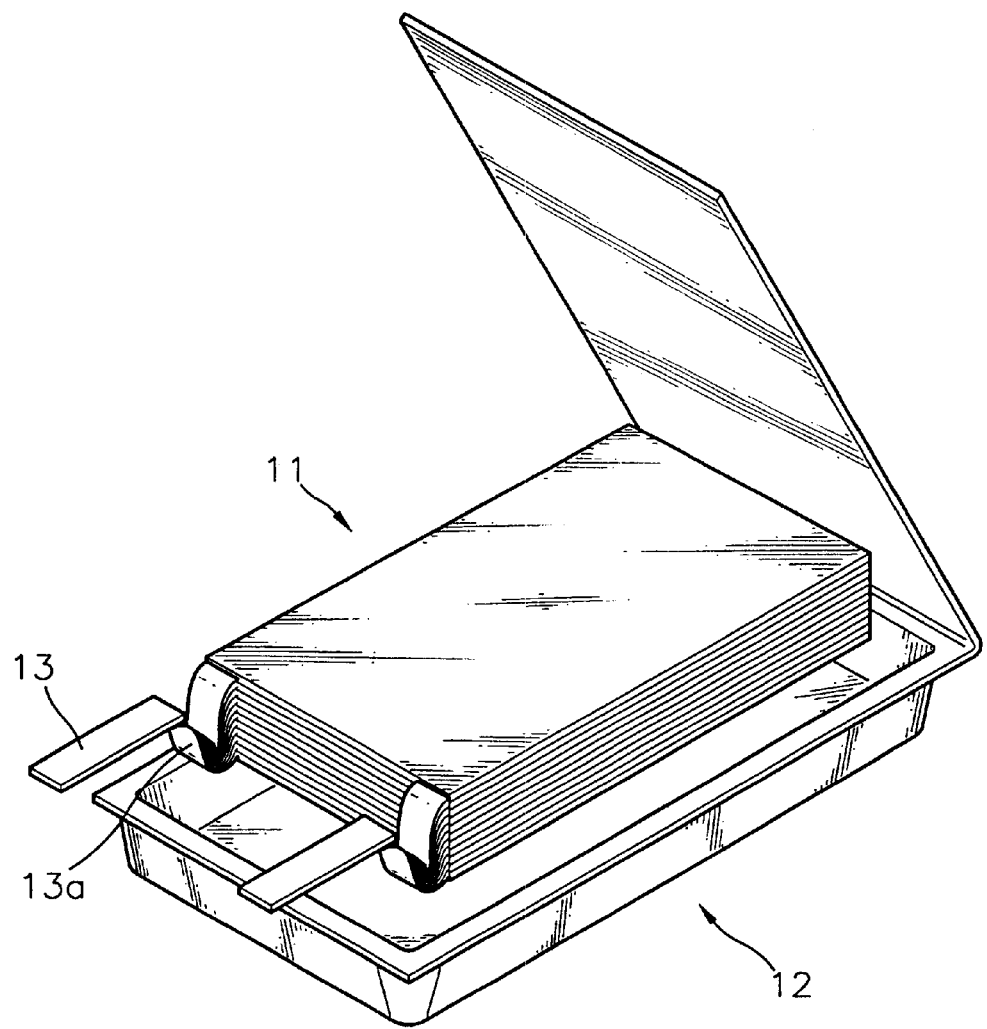
FIG. 1 is an exploded perspective view of an example of a conventional secondary battery.
Figure 2:
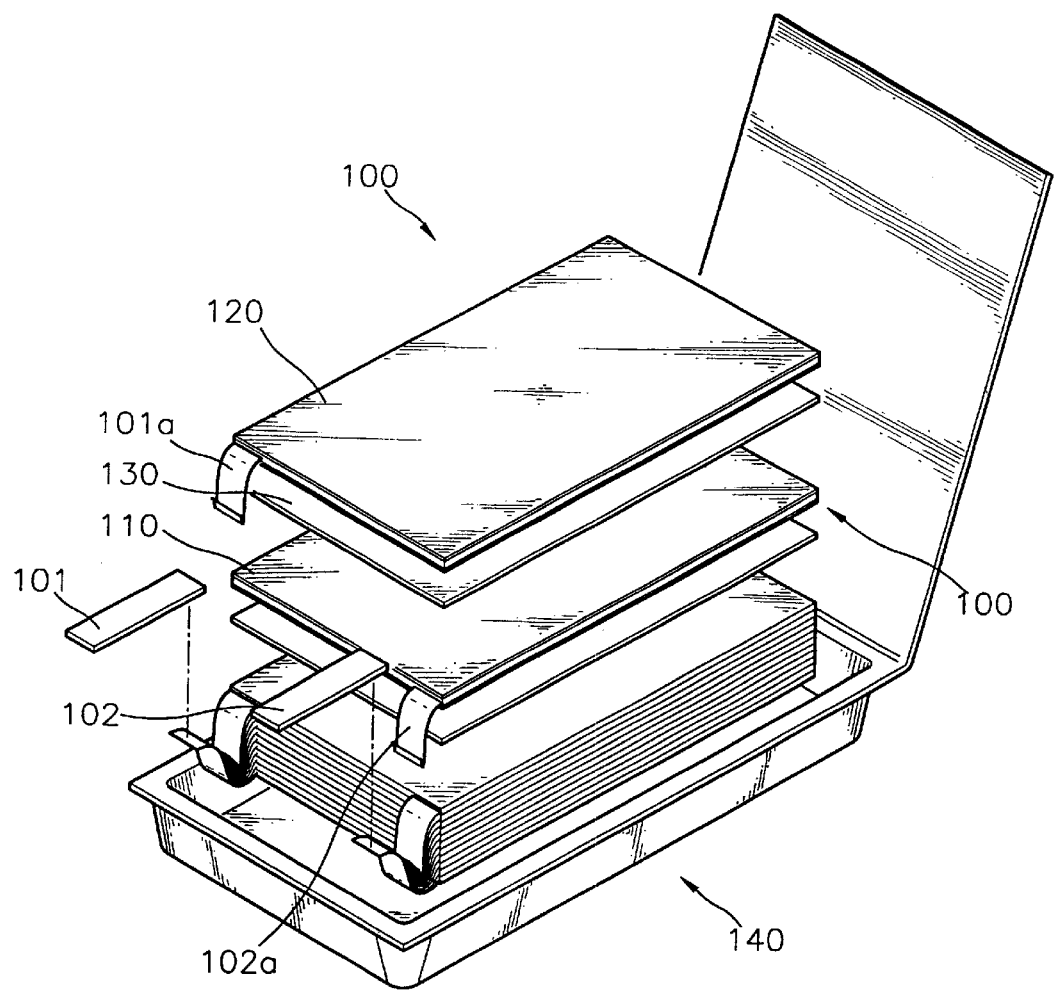
FIG. 2 is an exploded perspective view of a secondary battery according to the present invention.

Referring to FIG. 2, which shows a collector and a secondary battery adopting the collector according to the present invention, an electrode assembly 100 is formed by alternating a positive electrode 110 and a negative electrode 120 with a separator 130 interposed therebetween. The positive electrode 110 and the negative electrode 120 are connected to electrode tabs 101 and 102, respectively, by conductive connection members 102a and 101a. Also, the electrode assembly 100 is sealed by the case 140, and terminals of the electrode tabs 101 and 102 are drawn out of a case 140.

Figure 3:
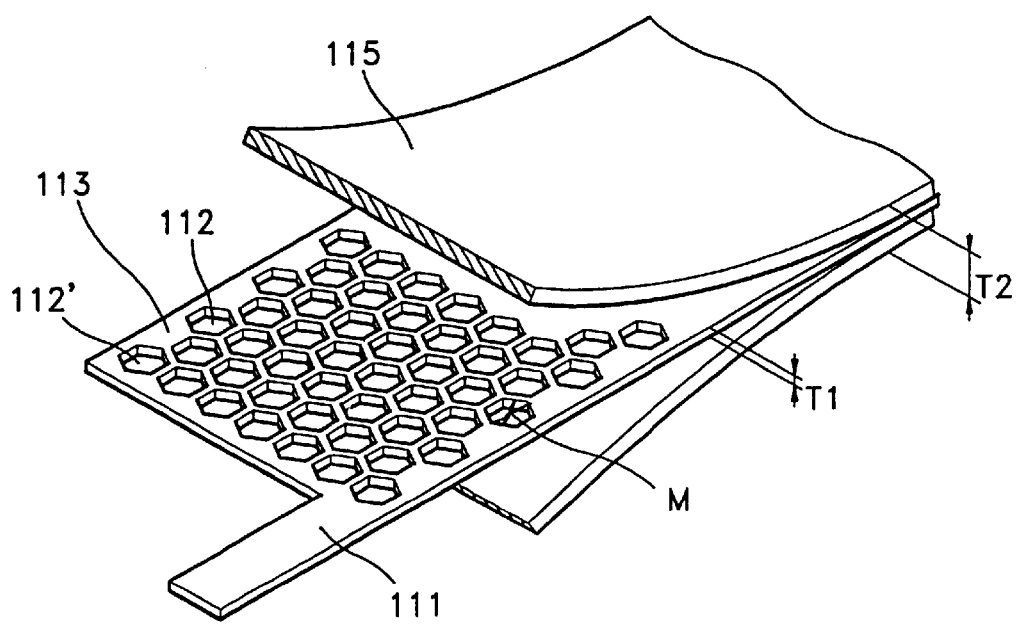
FIG. 3 is a partially exploded perspective view of the electrode assembly of FIG. 2.

In the secondary battery having the above structure, the positive and negative electrodes 110 and 120 are obtained by attaching an active material sheet 115 containing an active material and an additive to the collector 111 as shown in FIG. 3. After the positive and negative electrodes 110 and 120 are combined with the separator 130 interposed therebetween, a plasticizer is extracted from the active material sheet 115 and the separator 130, and then an electrolyte is injected into the empty space of the resulting electrode assembly from which the plasticizer has been extracted.

The collector 111 is a thin plate formed of copper (Cu) or aluminum (Al), having a plurality of circular or polygonal through holes 112. The surface of the thin plate is coated with zinc (Zn) and carbon (C) so as to improve the conductivity thereof. Also, the width of a rib 113 separating the adjacent through holes 112 and 112' is uniform over the entire collector 111. Preferably, the through holes 112 are made in the form of a regular polygon, e.g., rectangle, triangle, or hexagon.

Figure 4:
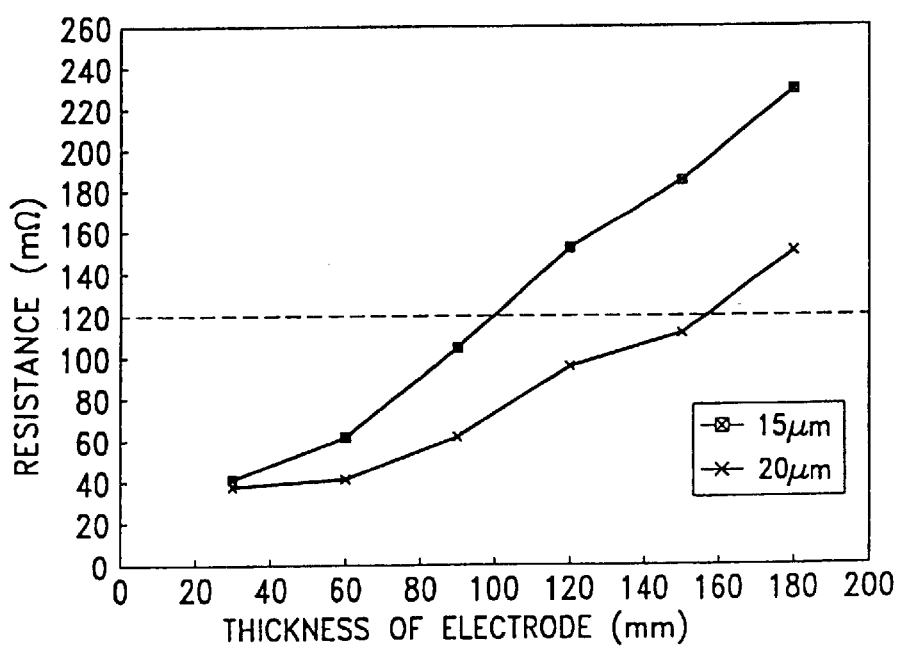
FIG. 4 is a graph showing the relationship between the thickness of the electrode and the resistance according to the present invention.

FIG. 4 shows the performance of the electrode according to the thickness T2 (see FIG. 3) of the electrodes 110 and 120, and the thickness T1 (see FIG. 3) of the collector 111. Here, the thicknesses of the used punched metal was 15 $\mu$m and 25 $\mu$m.

The resistance of the electrodes was measured by increasing the thickness of an active material sheet attached to each collector. As a result, in the case of the electrode adopting the collector with a thickness T1 of 15 $\mu$m, the resistance of the battery is 120 m$\Omega$ with an electrode thickness T2 of 102 mm, which is not suitable to be used as a battery. Also, in the case of the electrode adopting the collector with a thickness T1 of 25 $\mu$m, the resistance of the battery reaches 120 m$\Omega$ with the electrode thickness T2 of 158 mm, which cannot be used for a battery.

That is, it is clear that the thickness of the electrode T2 is approximately 7 times the thickness T1 of the collector.

As a result of accurate calculation based on the above, it is preferable that the thickness T1 of the collector has the following relationship (1) with the thickness T2 of electrode.

$$T2 \leq 6.32 \times T1 \tag{1}$$

In addition, the smaller the size of the through holes 112 formed in the collector 111, the larger the contact area between the collector 111 and the active material sheet 115 is, which increases conductivity. However, as the amount of the plasticizer extracted decreases, the amount of electrolyte injected into the electrode assembly decreases. Also, the size of the through holes 112 affects the tensile force of the collector and electrode.

In order to investigate the relationship between the size M of the through holes 112 and the conductivity of an electrode, the size M of the through holes formed in the collector 111 of an electrode with a thickness of 80 $\mu$m was varied to 0.1 mm, 0.3 mm, 0.7 mm, 1.5 mm and 2.0 mm, and then the resistance of the electrodes were measured.

Figure 5:
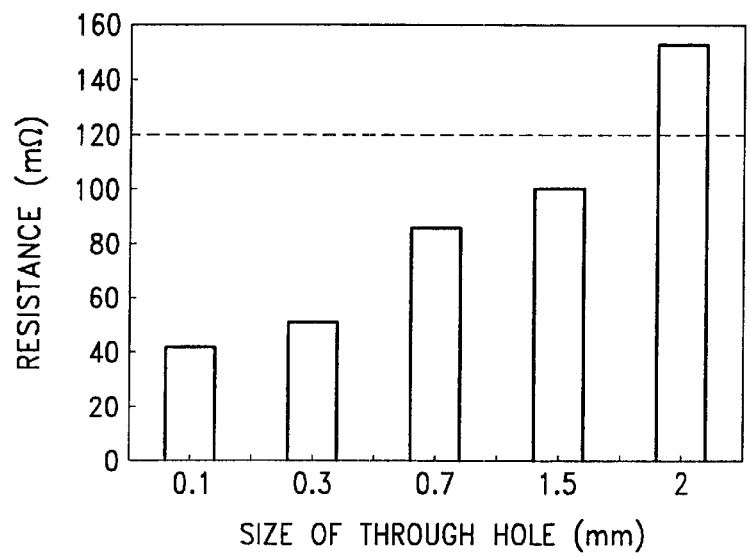
FIG. 5 is a graph showing the relationship between the size of through holes formed in a collector and the resistance according to the present invention.

As a result, as shown in FIG. 5, when the size M of the through hole was 0.1 mm, the conductivity of the electrode was excellent with a resistance of approximately 40 m$\Omega$, and resistance of the electrode adopting the collector having through holes of 2.0 mm was 153 m$\Omega$ which exceeds the battery operational resistance of 120 m$\Omega$.

Figure 6:
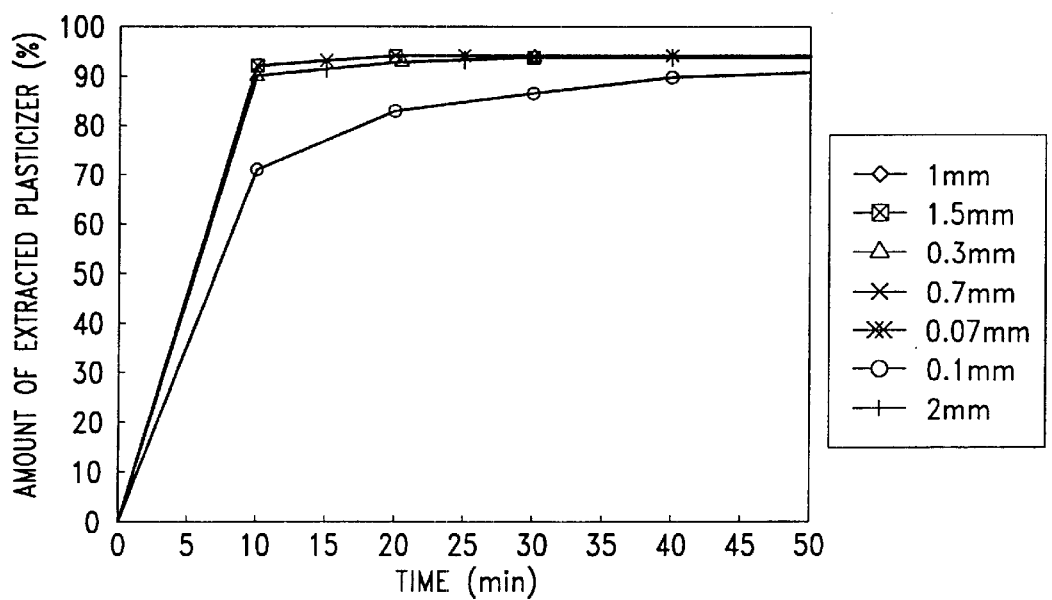
FIG. 6 is a graph showing the relationship between the size of the through holes and the amount of extracted plasticizer varying with the time.

FIG. 6 shows the amount of extracted plasticizer according to the size M of the through holes 112 in the collector 111. As shown in FIG. 6, in the cases where the size M of the through hole 112 was 0.3 mm, 0.7 mm, 0.5 mm and 2.0 mm, a plasticizer of 90% or more was extracted within 10 minutes. Meanwhile, in the case where the size M of the through hole was 0.1 mm, the amount of plasticizer extracted reaches 90% or more after 50 minutes.

As can be understood from the above results, in the case of the collector 111 having through holes of 0.1 mm, the conductivity of the electrode is excellent while the amount of plasticizer extracted is small. On the other hand, in the case of the collector having through holes of 2 mm, a large amount of plasticizer is extracted while the conductivity is low. The same result as above is obtained in an electrode having a different thickness. Thus, preferably, the size of the through holes 112 in the collector 111 is in a range of 0.2~2 mm. The size M of the through holes 112 and the thickness T2 of the electrode have the following relationship (2).

$$3.7T2 \leq M \leq 18.75T2 \tag{2}$$

Figure 7:
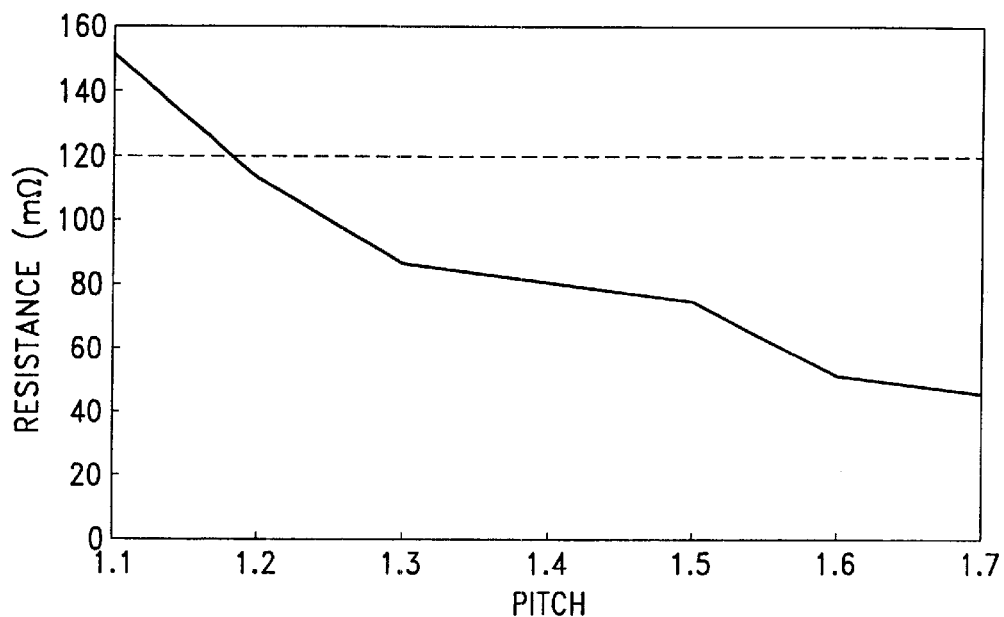
FIG. 7 is a graph showing the relationship between the pitch of the through holes and the resistance according to the present invention.
Figure 8:
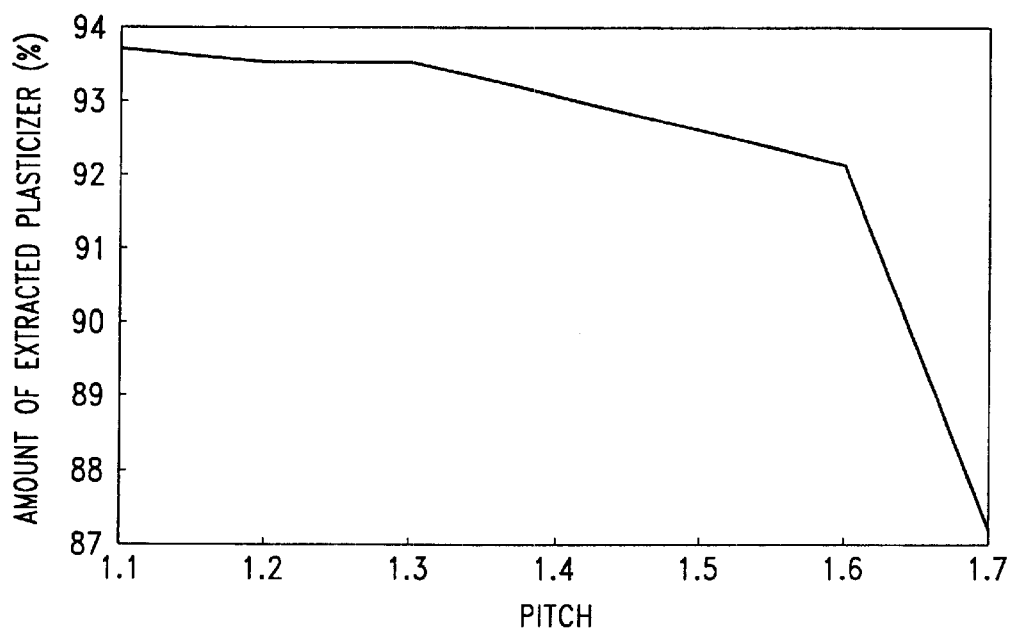
FIG. 8 is a graph showing the relationship between the pitch of the through holes and the amount of extracted plasticizer according to the present invention.

The relationship between the distance between each center of the through holes 112, that is, a pitch P, and the size M of the through holes is graphically expressed in FIGS. 7 and 8. To obtain the results, collectors each having pitches corresponding to 1.1, 1.2, 1.3, 1.5, 1.6 and 1.7 times the size M of the through holes were manufactured, and the amount of plasticizer extracted and the electrical conductivity were measured.

As a result, the resistance of the collector with the pitch of 1.1 M reached 150 m$\Omega$, which exceeds the battery's critical resistance of 120 m$\Omega$. When the pitch is in a range of 1.1 M to 1.6 M, the amount of extracted plasticizer was in a normal range as 92% (in 30 minutes). However, in the case where the pitch is 1.7 M, the amount of plasticizer extracted in 30 minutes was 87%. That is, it can be understood that it is preferable that the pitch P of the through hole 112 has a relationship (3) with the size M of the through holes.

$$1.2M \leq P \leq 1.6M \tag{3}$$

In the collector according to the present invention and a secondary battery adopting the collector, the collector 111 is flat, thin, and has a uniform thickness. Through holes 112 having a polygonal shape are located at a uniform interval, thereby improving the electrical conductivity between the active material sheet and the collector.

Also, the pitch P of the through hole 112 is in a predetermined range, so a uniform electron transfer path is guaranteed and the plasticizer is smoothly extracted. Further, part of the active material sheet enters each through hole 112, thereby reinforcing the adhesion between the collector and the active material sheet.

In particular, because the thickness T2 of the electrode reaches six times the thickness T1 of the collector 111, and the size M of the through hole 112 is in a range expressed by the relationship (2), generation of cavities is prevented, which occurs due to insufficient insertion of active material into the through holes when the active material sheet is attached to the collector.

According to the present invention, since a plurality of through holes 112 are present in the collector 111, continuous production is possible without deformation which is caused even by a small tensile force in the conventional case of using expanded metal. That is, the collector according to the present invention does not have through holes formed through expansion, but adopts a flat member in which a plurality of through holes are already punched in a predetermined shape. Thus, deformation by a small tensile force can be prevented.

According to the experimental results, the adhesion between the collector according to the present invention and the active material sheet was 15 kgf/mm which is a 50% or more improvement from that (10 kgf/mm) of the conventional collector. Also, the energy density of the battery was improved by 5~10% or more. In addition, it is easy to extract the plasticizer from and inject the electrolyte into the electrode assembly.

While the present invention has been illustrated and described with reference to specific embodiments, further modifications and alterations within the spirit and scope of this invention as defined by the appended claims will become evident to those skilled in the art. For example, the collector according to the present invention can be applied to a wound electrode assembly and a corrugated electrode assembly.

What is claimed is:

1. A secondary battery comprising:

an electrode assembly having
      electrodes, each electrode including a planar collector, an active material sheet on at least one side of the planar collector, having a thickness $T1$, and a plurality of through holes having a regular polygonal shape and arranged in a uniform pattern, the active material sheet having a thickness which, when added to the thickness $T1$ of the collector, is $T2$, and $T2 \leq 6.32 \times T1$, and
   a separator interposed between the electrodes;
   a sealed case containing the electrode assembly; and
   tabs connected to terminals of the electrode assembly and extending outwards from the case.

2. The secondary battery of claim 1, wherein, assuming that the polygonal through holes have a maximum opening dimension $M$ and $3.75 T2 \leq M \leq 18.75 T2$.

3. The secondary battery of claims 2, wherein, assuming that pitch between the polygonal through holes is $P$ and $1.2 M \leq P \leq 1.6 M$.

4. The secondary battery of claim 1, wherein the collector of each electrode is one of copper and aluminum.

* * * * *